June 24, 1930.  W. J. PINE  1,765,738
BRAKE TESTING DEVICE
Filed Sept. 27, 1926

INVENTOR.
Wilber J. Pine
BY
Erwin, Wheeler & Woolard
ATTORNEY.

Patented June 24, 1930

1,765,738

UNITED STATES PATENT OFFICE

WILBER J. PINE, OF KENOSHA, WISCONSIN

BRAKE-TESTING DEVICE

Application filed September 27, 1926. Serial No. 137,952.

This invention relates to improvements in brake testing devices.

It is the object of the invention to provide a novel, inexpensive and simplified mechanism for measuring the torque required to rotate a vehicle wheel at any given setting of the brake thereof and thereby to enable the brakes to be equalized and applied with equal pressure to each wheel.

More specifically stated, it is one of the important purposes of this invention to provide a device of this character which is of simple form mechanically, but which is more accurate than any other device heretofore used for this purpose in that it will maintain its reading for an indefinite period independently of human agencies.

It is a further object of the invention to provide an instrument for this purpose in such a compact form that it may readily be carried in any tool kit, the design, nevertheless, being such that accurate results may be obtained by any persons however inexperienced.

In the drawings.

Like parts are identified by the same reference characters throughout the several views.

Figures 1, 2:
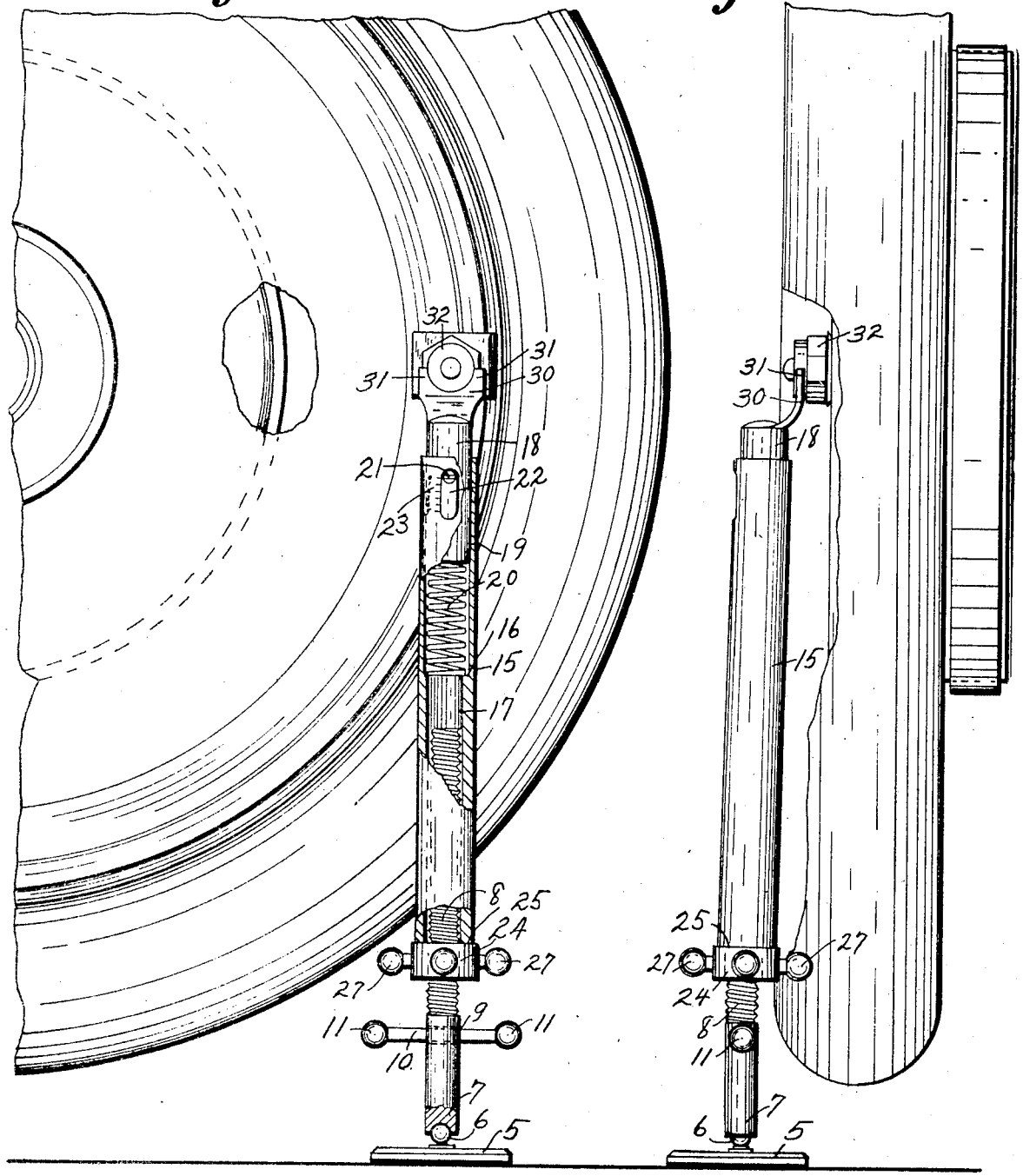
Figure 1 is a front elevation of my device, portions thereof being broken away to a vertical axial section to expose the interior mechanism.
Figure 2 is a side elevation of the device.

Reduced to its simplest terms, the device of the present invention consists simply in a base 5 upon which is mounted a jack-screw having a spring plunger in its end. The base is adapted to rest upon the ground or the floor of a garage, and the plunger includes means for engaging a peripheral portion of an automobile wheel for the purpose of applying the force of the jack-screw thereto in a direction tending to rotate the wheel. The amount of such force required to produce rotation is measured by the compression of the spring which supports the plunger.

I will now describe my device specifically.

The base 5 carries a ball 6 upon which the socketed end 7 of the screw 8 is swiveled. A transverse opening at 9 through the screw receives a handle bar 10 which is reciprocable therein in order to facilitate its use in close quarters. An enlarged head 11 at each end of the handle 10 fixes the handle within the bore 9 of the screw.

The body of the device is designated in its entirety by reference character 15 and comprises a tubular member differentially bored to provide a shoulder at 16 for a spring seat. The smaller bore 17 slips over the end of screw 8 and finds an elongated bearing upon the teeth thereof without being in threaded engagement therewith.

The plunger 18 is reciprocable in the larger bore 19 of the body and is maintained under the pressure of compression spring 20 which is confined between the lower end of the plunger and the shoulder 16 upon which it seats. A pointer 21 projects through a slot at 22 in the body and co-operates with an index scale at 23.

Relative movement between the body 15 of the device and the screw is provided by means of a nut 24 threaded upon the screw 8 and bearing at 25 upon the lower end of the tubular body member 15. The nut is not secured to the body, but friction thereon will ordinarily render it stationary during the rotation of the screw through handle 10. For quick adjustment to vary the overall length of the device preliminary to a brake testing operation, it is convenient to form the small levers 27 integrally with nut 24. Except for such adjustment the nut is in effect a part of body member 15.

In order to facilitate the application of the device to a vehicle wheel, I have provided an offset forked arm at 30, the extremities 31 of which are sufficiently far apart to receive any standard rim wedge nut 32. The application of the device to the wheel in this way contributes materially to its simplicity.

In operation the brake is set to any desired degree and it is held fixed at this setting in any desired manner.

With the brake set, the base member 5 is placed on the floor adjacent one of the wheels upon which the brake operates and with the screw resting in swiveled relation to the base, the nut 24 is quickly manipulated until the height of the device is such that its forked arm 30 will engage a rim nut 32 of the wheel. It is preferable to use a nut located on a horizontal radius of the wheel in order that the test may be accurate.

The device being now in place, handle 10 is used to rotate the screw 8 and thereby to feed nut 24 upwardly together with the body 15. The upward movement of the body subjects spring 20 to additional compression, the wheel being initially stationary and plunger 18 being likewise held fixed by the wheel.

Eventually the compression of spring 20 will be adequate to force the wheel to rotate against the resistance of the brake. It is a very important feature of this invention that the reading of pointer 21 on scale 23 at the time the wheel commences to move does not depend in any sense upon the ability of the operater to maintain a fixed position of the parts until the reading has been taken. In many devices for this purpose heretofore used a lever is manipulated to turn the wheel and in order to get an accurate reading the operator must maintain an exactly constant degree of pressure on the lever until the reading has been taken. In the present device the screw and nut will maintain themselves in any position to which they are adjusted and when the wheel begins to rotate the operator may entirely release his hold upon handle 10, if he so desires, in order to take an accurate reading of the force required. As a result of this arrangement, guess work is eliminated and an accurate reading is easily and quickly obtained.

After obtaining the reading for the first wheel, the device is quickly removed to another wheel and a similar reading is taken. The brakes are then adjusted if necessary until the same amount of force is required to move either wheel.

Scale or index 23 may be so designed if desired that the amount of force required to turn the wheel can be read in pounds, but this is unnecessary because in practice it is only required that the index shall serve as a basis for comparing the resistance of one wheel at a given brake setting with that of another. It is not necessary that the resistance should be measured in absolute terms.

During the test the vehicle wheels will obviously be supported clear of the ground so as to be free to rotate. It is immaterial whether a jack or other means be used for this purpose. It will likewise be obvious that a device of this invention may be used upon any number of wheels as a guide for the adjustment of their several brakes.

I claim:

1. In a device of the character described, the combination with a base, of a screw swiveled thereto, a handle for the rotation of said screw, a nut threaded upon said screw, a member mounted on said nut and providing a spring seat, a plunger guided in said member, a spring supporting said plunger from said seat, and a forked arm carried by said plunger.

2. The combination with a base member and a body member, of a screw swiveled upon said base member and adjustably supporting said body member, a spring carried by said body member, and a laterally offset wheel engaging arm mounted on said body member to receive motion through said spring therefrom.

3. The combination with a base provided with a swivel ball, of a socketed screw mounted on said ball, a nut loosely threaded to said screw, a tubular body member carried by said nut and in bearing contact with said screw, a spring carried by said body member, and a plunger supported by said spring and reciprocable in said body member and provided with a wheel engaging arm.

4. The combination with a base and a screw swiveled thereto, of a nut threaded to said screw, a body member freely reciprocable on said screw and supported by said nut, a spring carried by said body member, and a wheel engaging arm supported by said spring and yieldably guided from said body member to receive therefrom the thrust of said nut.

5. The combination with a base and a screw in swiveled connection, of a nut upon said screw, a body member having a differential bore, the smaller portion of which is slidably guided on the end of the screw and supported by said nut, a plunger receivable in the larger portion of the bore of said body member, a spring confined within the bottom of said larger portion and arranged to support said plunger, and a wheel engaging arm carried by the plunger.

6. The combination with a base and a screw in swiveled connection, of a nut upon said screw, a body member having a differential bore, the smaller portion of which is slidably guided on the end of the screw and supported by said nut, a plunger receivable in the larger portion of the bore of said body member, a spring confined within the bottom of said larger portion and arranged to support said plunger, and a wheel engaging arm carried by the plunger, said arm being slightly offset in a lateral direction and having a forked extremity adapted to embrace a rim wedge nut.

7. A brake testing device comprising the combination of a series of three members in mutually extensible relation, means for mechanically adjusting one of said members with reference to another, means for guiding the third member for yielding movement with reference to one of said first mentioned members, a base carried by one of said members at one end of the series, a laterally offset wheel engaging device carried by the member at the other end of the series, a spring acting on said yieldable member in a direction to extend it with reference to the other two, and an index device arranged to indicate the degree of yielding of said yieldable member under load, said wheel engaging device being formed to engage a portion of a vehicle wheel remote from its axis whereby said device is adapted for mechanical extension between the ground and such wheel portion to give a relative reading of the power required for the rotation of a wheel.

8. A brake testing device comprising a jack provided with a yieldable portion, means at one end of the jack for engaging a rotatable part of a wheel, resilient means associated with said yieldable portion to resist the yielding thereof whereby indications of force are secured and a base at the other end of the jack flexibly connected therewith and adapted to accommodate itself to road inequalities and to the movement of the jack as the wheel moves under test.

9. A brake testing device comprising the combination with a jack screw provided with a resiliently yieldable portion, resilient means associated with said yieldable portion to resist the yielding thereof whereby indications of force are secured, an index adapted to afford a reading of the yielding movement of said portion, means at one end of said jack screw adapted to engage a rotatable part of a wheel, and a base at the other end of said jack screw flexibly connected therewith, whereby to be self-adjusting to road inequalities and to accommodate the tilting movement of said jack screw in the course of wheel rotation.

10. A brake testing device comprising the combination of a series of three members in mutually extensible relation, means for mechanically adjusting one of said members extensibly with reference to another, means for yieldably supporting and guiding the third member with reference to one of said first mentioned members, a base flexibly connected with a member at one end of the series whereby to be self-adjusting to road inequalities and to permit of the inclination of the series of members with reference thereto in use, and a head at the other end of said series of members adapted to engage a vehicle wheel at a rotatable portion thereof.

WILBER J. PINE.